US008572855B2

(12) United States Patent
Schröder

(10) Patent No.: US 8,572,855 B2
(45) Date of Patent: Nov. 5, 2013

(54) ROTARY POSITION TRANSDUCER ASSEMBLY WHICH COMPENSATES FOR RADIAL PLAY

(75) Inventor: Dierk Schröder, Grossenkneten (DE)

(73) Assignee: Manitowoc Crane Group France SAS (FR)

( * ) Notice: Subject to any disclaimer, the term of this patent is extended or adjusted under 35 U.S.C. 154(b) by 223 days.

(21) Appl. No.: 13/215,850

(22) Filed: Aug. 23, 2011

(65) Prior Publication Data

US 2012/0117810 A1 May 17, 2012

(30) Foreign Application Priority Data

Aug. 24, 2010 (DE) ..................... 20 2010 011 721 U

(51) Int. Cl.
*G01B 7/30* (2006.01)

(52) U.S. Cl.
USPC ........................................................ 33/1 PT

(58) Field of Classification Search
USPC .................................. 33/1 PT, 1 N, 534, 536
See application file for complete search history.

(56) References Cited

U.S. PATENT DOCUMENTS

| | | | | |
|---|---|---|---|---|
| 5,271,269 | A * | 12/1993 | Rilling et al. | 73/114.15 |
| 5,426,995 | A * | 6/1995 | Maennle | 74/506 |
| 5,621,179 | A * | 4/1997 | Alexander | 73/862.331 |
| 6,311,402 | B1 * | 11/2001 | Brandl et al. | 33/1 PT |
| 6,374,664 | B1 * | 4/2002 | Bauer et al. | 73/117.02 |
| 7,540,095 | B2 * | 6/2009 | Siraky et al. | 33/1 PT |
| 2008/0163502 | A1 * | 7/2008 | Siraky et al. | 33/1 PT |
| 2012/0117810 | A1 * | 5/2012 | Schroder | 33/1 PT |

FOREIGN PATENT DOCUMENTS

DE 10 2008 025 027 A1 6/2011

* cited by examiner

*Primary Examiner* — Yaritza Guadalupe-McCall
(74) *Attorney, Agent, or Firm* — Brinks Hofer Gilson & Lione; Steven P. Shurtz; John C. Bacoch

(57) ABSTRACT

A rotary position transducer assembly for a rotary connection on a work machine, between a first rotary element and a second rotary element, includes a rotary position transducer and a roll-off element coupled to the rotary position transducer, configured to roll off on the circumferential area on the first rotary element. The rotary position transducer detects a rotational movement about a first rotational axis of the roll-off element. The rotary position transducer assembly further includes a bearing securing the roll-off element to the second rotary element such that the roll-off element can be translationally adjusted to vary a distance between the roll-off element and the first rotary element.

20 Claims, 2 Drawing Sheets

ROTARY POSITION TRANSDUCER ASSEMBLY WHICH COMPENSATES FOR RADIAL PLAY

FIELD

The invention relates to a rotary position transducer assembly compensating for radial play in a rotary connection, such as a rotary connection on work machines, and in particular for a ball rotary connection or roller rotary connection between upper structure and undercarriage of a mobile crane.

BACKGROUND

In a mobile crane, a rotary table of an upper structure is typically rotatably connected to a mobile crane undercarriage via a ball rotary connection or roller rotary connection. If the rotary connection is not exactly centered on the rotary table, a radial variance between the rotary connection and the rotary table can occur upon first assembly of the rotary connection to the rotary table. When a rotary position transducer is disposed on the rotary table of the upper structure, an undesired radial variation on engagement of the rotary position transducer with the circumferential ring gear of the rotary connection also occurs. In the prior art, therefore, one disposes the rotary position transducer at an end of a bendable arm, which is fixed to the rotary table of the upper structure with its other end and holds the rotary position transducer to the ring gear under preload. By the elastic deformation of the bendable arm, the radial variation is compensated for. Since the rotary connections have very large diameters, due to manufacturing tolerances, variations in the concentricity of the ring gear often also occur, which are also compensated for by the bendable arm.

However, upon rotating the upper structure, the bendable arm protruding beyond the rotary table and the rotary position transducer can easily be damaged. For example, a lifting means placed on the undercarriage, such as belts or chains, can get caught on the arm and bend it.

Thus, the invention is based on the object to provide a rotary position transducer assembly, which compensates for the occurring radial play on the rotary connection and avoids damages to the rotary position transducer at the same time.

SUMMARY

An embodiment of a rotary position transducer assembly for a rotary connection on a work machine, between a first rotary element and a second rotary element, includes a rotary position transducer and a roll-off element coupled to the rotary position transducer, configured to roll off on the circumferential area on the first rotary element. The rotary position transducer detects a rotational movement about a first rotational axis of the roll-off element. The rotary position transducer assembly further includes a bearing securing the roll-off element to the second rotary element such that the roll-off element can be translationally adjusted to vary a distance between the roll-off element and the first rotary element.

Another embodiment of the a rotary position transducer assembly for measuring the rotation between a first rotary element and a second rotary element includes a base having an opening and a means for securing the base to the second rotary element, a cam disposed proximate the opening, the cam having a first axis of rotation, a clamping means for fixing a rotation of the cam relative to the cam base, a rotary position transducer coupled to the cam, the rotary position transducer having a second axis of rotation offset from the first axis of rotation, and a roll-off element rotationally coupled to the rotary position transducer.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

Figure 1:
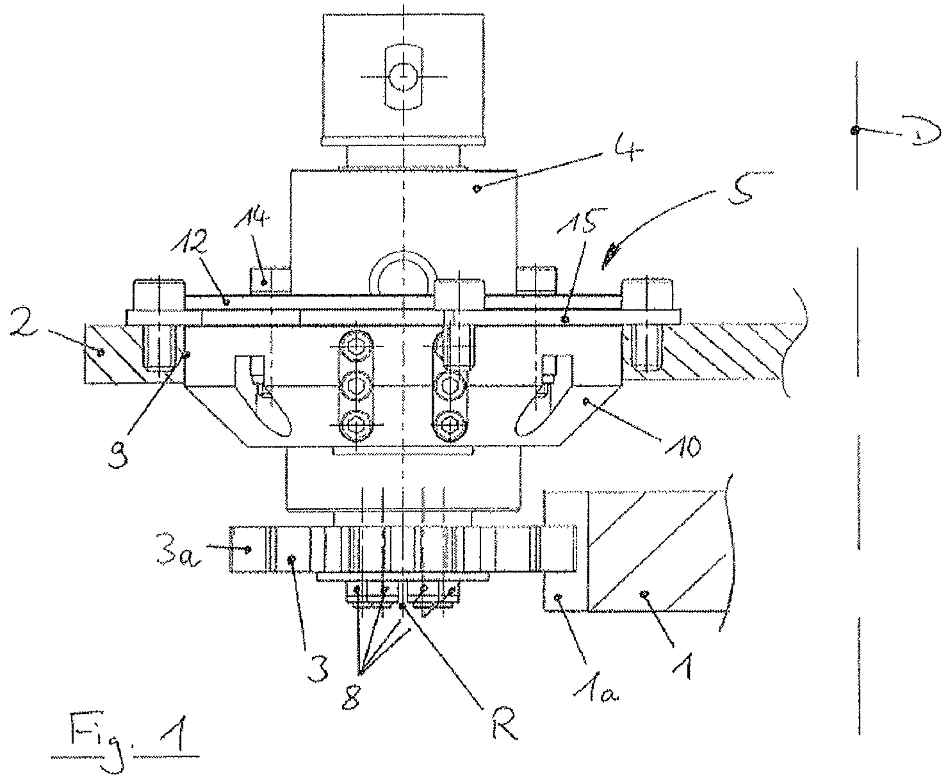
FIG. 1 shows a side view of an embodiment of a rotary position transducer assembly according to the invention in an installed state.

The drawings are not necessarily to scale.

DETAILED DESCRIPTION

In one embodiment, the rotary position transducer assembly is provided for a crane rotary connection, which allows rotation between two rotary elements, for example an upper structure and an undercarriage of a mobile crane. However, other embodiments are possible in which the basic idea according to the described embodiment is applied to other rotary connections, in particular to rotary connections on any mobile work machine.

The rotary position transducer assembly includes an elastic roll-off element that is coupled to the rotary position transducer. The elastic roll-off element rolls off on the first rotary element via its circumferential area, wherein the rotary position transducer detects the rotational movement about the rotational axis of the roll-off element and the roll-off element is held translationally and/or rotationally adjustable by the second rotary element by means of a bearing in order to thus vary the distance of the roll-off element to the first rotary element.

In other words, the rotary position transducer assembly includes a roll-off element deformable in the elastic range, which can for example have a smooth circumferential roll-off surface like a friction wheel. In order to avoid slip between roll-off element and rotary element, however, it can also have a toothing or the like. This roll-off element rolls off on a corresponding area of a first rotary element via its circumferential area and is therein retained or supported by a second rotary element, which is rotationally movable relatively to the first rotary element. Therein, the rotational axis of the roll-off element is stationary with respect to the second rotary element and the rotational movement of the roll-off element is transferred to a rotary position transducer such that the roll-off path of the roll-off element can be determined.

According to the present invention, the roll-off element is not directly supported by the first rotary element; rather, a bearing is interposed between the roll-off element and the first rotary element and thus couples the roll-off element and second rotary element to each other. This bearing allows rotation and/or translation of the roll-off element relatively to the first rotary element. In this manner, the distance of roll-off element and first rotary element can be varied. In some embodiments the roll-off element is held by means of a bearing disposed substantially within the first rotary element and thus is kept protected from damage.

The bearing holds the roll-off element such that it can be rotated about a second rotational axis different from the rotational axis of the roll-off element. Since the second rotational axis is different from the first rotational axis caused by the roll-off movement of the roll-off element, a distance variation between roll-off element and first rotary element, on which the roll-off element rolls off, arises upon rotation of the roll-off element about the second rotational axis.

By this distance variation the elastic roll-off element is preloaded with respect to the first rotary element or the ring gear. Subsequently, only manufacturing/assembly tolerances of the rotary connection or of the ring gear of the rotary connection have to be compensated for. According to the present invention, this is affected by the elastic roll-off element, which compensates for concentricity tolerances to a certain extent, while the rotational axis of the roll-off element does not vary its position and orientation relative to the rotary table/second rotary element. Thus, the present invention provides a dual radial tolerance compensation, wherein course adjustment is effected by rotating the roll-off element in the bearing about the second rotational axis and the tolerances induced by the manufacture of the rotary connection or of the ring gear of the rotary connection are compensated for by the elastic configuration of the roll-off element.

According to one embodiment of the present invention, the roll-off element is a pinion engaging with and rolling off on the circumferential toothing of a rotary connection ring gear on the first rotary element. The advantage of a corresponding toothing of pinion and ring gear is in that slip between roll-off element and the first rotary element with the ring gear and measuring inaccuracies associated therewith will not occur.

According to another embodiment of the present invention, the second rotational axis runs parallel to the rotational axis of the roll-off element, about which the rotation caused by rolling off is effected. Accordingly, the movement that the roll-off element performs by rotating about the second rotational axis is oriented perpendicularly to the first rotational axis and, if the circumferential area of the roll-off element is oriented parallel to the first rotational axis, then the movement of the roll off element is also perpendicular to this circumferential area. Furthermore, it is possible that the second rotational axis is oriented parallel to the rotational axis between first and second rotary element such that the movement that the roll-off element performs upon rotation about the second rotational axis is oriented perpendicularly to the rotational axis between the rotary elements and, if the corresponding roll-off area or toothing on the second rotary element/undercarriage runs parallel to the rotational axis between the rotary elements, also perpendicularly to this roll-off area or ring gear toothing of the undercarriage. If all of the three rotational axes run parallel, thus, the roll-off element is inserted or extended perpendicularly to the rotational axes into the outer toothing of the ring gear upon rotation about the second rotational axis, such that in this manner a possible radial play can be compensated for in simple manner. According to the present invention, this will be effected after assembly of the rotary connection to the rotary table, wherein the desired position of the rotary position transducer is subsequently fixed such that the rotary position transducer is positionally properly adjusted to the rotary connection from this point in time. Therefore, in the present invention, for compensating for large tolerances, the rotary position transducer no longer has to be attached to a bendable arm prone to failure.

For compensating for further small tolerances, according to a further preferred embodiment, the elastic roll-off element can include an elastic material. For instance, it can be an elastic plastic, in particular rubber. Herein, the roll-off element can be totally manufactured from elastic material such that a kind of rubber gear results. On the other hand, it would also be possible to form the roll-off and circumferential area or the roll-off toothing on an inelastic element, which circumferentially surrounds an elastic element. In this manner, the roll-off area or toothing of the roll-off element can be formed hard, pressure and wear resistant without losing the elastic properties of the roll-off element as a whole. This is in particular advantageous if there is a risk of icing on tooth profile surfaces. Therein, the inelastic element can be configured as a ring, in which a toothing is machined and which surrounds a rubber element as an insert. The interior elastic element then couples the inelastic ring portion to a drive element of the rotary position transducer in order to pass the rotation of the roll-off element to the rotary position transducer.

Preferably, the bearing includes a receptacle for a cam, wherein the bearing itself can be formed on or in the second rotary element. The received cam then supports the roll-off element such that the rotational axis of the roll-off element in the cam is different from the rotational axis of the cam in the receptacle of the rotary element.

In particular, the receptacle can be a through-bore in the second rotary element or in the rotary table of a mobile crane. In this form of configuration, the bearing and thus also the roll-off element are seated more or less in the solidly constructed rotary table and are not attached to a bendable arm outside of the rotary table as done in the prior art.

According to another embodiment of the present invention, the cam supports the roll-off element coupled to the rotary position transducer together with the rotary position transducer such that the cam circumferentially encompasses and retains the rotary position transducer.

However, in principle, it would also be conceivable that the rotary position transducer is disposed at another location other than on or in the bearing and the rotary movement of the roll-off element is transferred via a drive element, for example via a rigid or flexible shaft.

In order to fix the desired position of the roll-off element and optionally of the rotary position transducer relative to the first rotary element or ring gear of the undercarriage after assembly and subsequent positioning of the rotary position transducer assembly, the rotary position transducer assembly according to the invention can have a fixing means, by which the adjustable retainer of the roll-off element and optionally of the rotary position transducer can be locked such that further rotation of the roll-off element and optionally of the rotary position transducer about the second rotational axis is not possible. Hereby, the roll-off element can also be preloaded against the ring gear with a certain force in play compensating manner, which is allowed by employment of an elastic roll-off element.

It is also conceivable that the fixing means includes a clamping ring, which is screwed to the cam and thereby clamps a base disposed between clamping ring and cam, having longitudinal holes for the screw connection and fixed to the second rotary element. As soon as the desired position of the roll-off element relative to the first rotary element has been adjusted, the screw connection of clamping ring to cam is tightened and herein clamps a base between clamping ring and cam, wherein the base itself can be fixedly connected, for example screwed, to the rotary table. By the screw connection between clamping ring and cam being guided in longitudinal holes of the base, a simple adjustment of the rotary position transducer assembly is possible.

The present invention is explained in more detail by way of an embodiment from FIGS. 1 to 4. Herein, the invention can include shown features individually as well as in any reasonable combination.

In FIG. 1, a rotary table 2 of an upper structure and a ring gear 1 of an undercarriage are shown, wherein the rotary table 2 is rotationally movable relatively to the ring gear 1 about the rotational axis D. If such a rotation occurs, the rotary position transducer assembly fixedly screwed to the rotary table 2 is moved in its bearing 5 about the rotational axis D, wherein the roll-off element 3 rolls off on a corresponding circumferential area 1*a* of the ring gear 1 with its circumferential area 3*a*. Herein, the circumferential areas 1*a* and 3*a* are corresponding spur gear toothings.

The roll-off element 3 rotates about the rotational axis R and is screwed to the rotary position transducer 4 such that only a rotational movement about the axis R is possible. Therein, the housing of the rotary position transducer 4 is fixedly retained by the cam 10. Further, it is seen that the rotary table 2 also has a through-bore 9, in which the cam 10 is inserted. By means of the screw connection 14, the base 15 is clamped by the clamping ring 12 and the cam 10 such that the cam together with the clamping ring 12 cannot be rotated relatively to the base 15. Since the base 15 is screwed to the rotary table 2, the cam is also fixedly retained in the rotary table 2.

Figure 2:
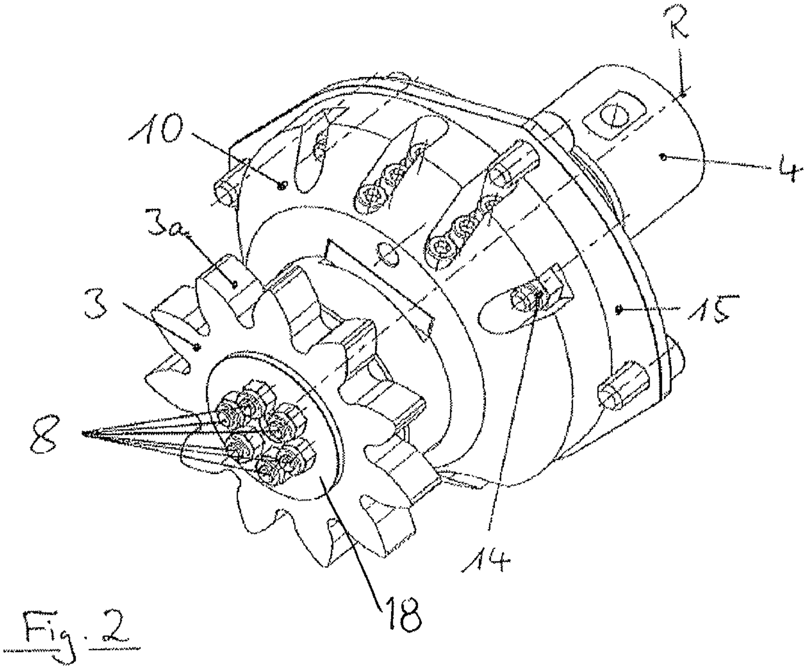
FIG. 2 shows the embodiment of FIG. 1 in a perspective view

FIG. 2 shows a perspective view of the rotary position transducer assembly with the cam 10, the base 15, and the roll-off element 3 rotationally movable about the rotational axis R with the circumferential toothing 3*a*. Further, the screw connection 8 of the elastic roll-off element 3 is seen, wherein an inelastic disk 18 allows the screw connection of the elastic roll-off element 3 to the input shaft of the rotary position transducer.

Figure 3:
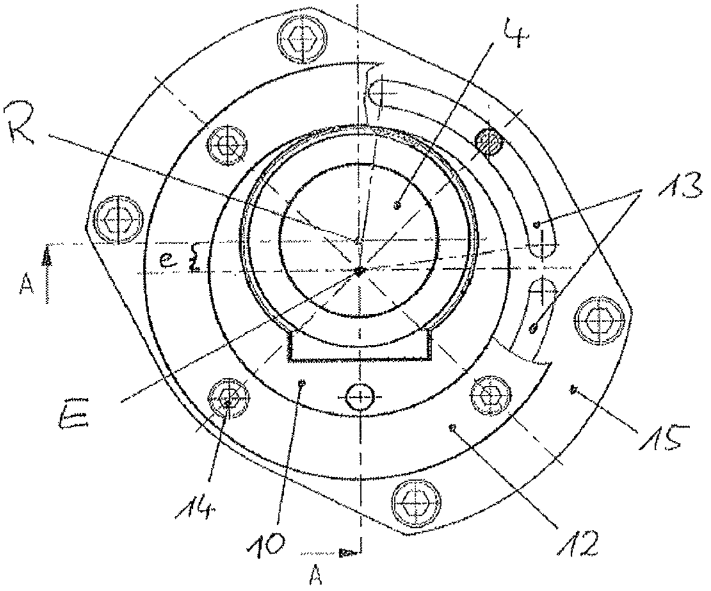
FIG. 3 shows the embodiment of FIG. 1 in a plan view.

In FIG. 3, a plan view of the rotary position transducer assembly according to the invention, the eccentricity e between the first rotational axis, about which the roll-off element 3 rotates upon rolling-off via its toothing 3*a*, and the second rotational axis E, about which the cam 10 can be rotated in the bore 9, if it is not fixedly clamped rotationally secure with the clamping ring 12 and the screw connection 14 on the base 15, is shown. Further, the longitudinal holes 13 can be seen, which allow rotation of the cam together with the clamping ring 12 and the screw connection 14, if the screw connection 14 has been released.

Figure 4:
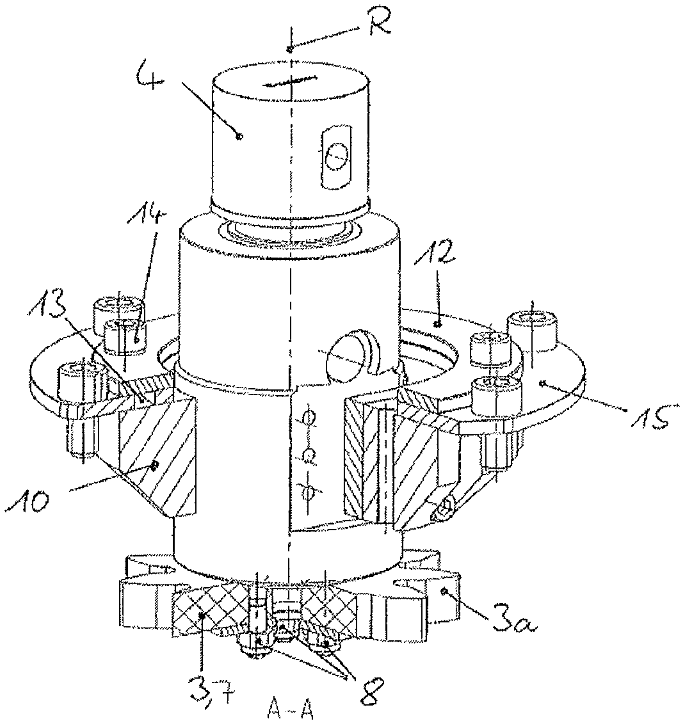
FIG. 4 shows a section view of the embodiment of FIG. 1 taken across section AA of FIG. 3.

In FIG. 4, a sectional view along A-A of FIG. 3 is seen. In particular, it is also seen that in this embodiment, the elastic portion 7 of the roll-off element 3 extends up to the roll-off toothing 3*a* and directly contacts the toothing 1*a* of the ring gear. In other embodiments, the elastic portion 7 of the roll-off element 3 does not extend to the roll-off toothing 3*a* and instead extends only to an inelastic circumferential ring. Further, it is seen that the housing of the rotary position transducer has a kind of key surface, which engages with a corresponding retaining surface of the cam 10 not further denoted and prevents rotation of the rotary position transducer 4 relatively to the cam 10. This is supported by a screw connection not further denoted.

What is claimed is:

1. Rotary position transducer assembly for a rotary connection on a work machine, between a first rotary element and a second rotary element, the rotary position transducer assembly comprising:

a rotary position transducer;

a roll-off element coupled to the rotary position transducer and configured to roll off on the circumferential area of the first rotary element, wherein the rotary position transducer detects a rotational movement about a first rotational axis of the roll-off element; and a bearing securing the roll-off element to the second rotary element the such that the roll-off element can be translationally adjusted to vary a distance between the roll-off element and the first rotary element.

2. The rotary position transducer assembly according to claim 1, wherein the roll-off element is retained adjustable about a second rotational axis that is different from the first rotational axis by means of the bearing disposed within the second rotary element.

3. The rotary position transducer assembly according to claim 1, further comprising a rotary connection ring gear having a circumferential toothing on the first rotary element, wherein the roll-off element is a pinion, which engages with and rolls off on the circumferential toothing.

4. The rotary position transducer assembly according to claim 2, wherein the second rotational axis is oriented parallel to the first rotational axis of the roll-off element and parallel to the rotational axis between the first rotary element and the second rotary element.

5. The rotary position transducer assembly according to claim 3, wherein the roll-off element includes a rubber material.

6. The rotary position transducer assembly according to claim 5, wherein the roll-off element has an inelastic ring portion and the inelastic ring portion is coupled to a drive element by means of an elastic insert, wherein the drive element transfers the rotational movement of the roll-off element to the rotary position transducer.

7. The rotary position transducer assembly according to claim 1, wherein the bearing includes a receptacle for a cam mounted to the second rotary element, the receptacle supporting the cam about the second rotational axis, and the cam supporting the roll-off element about the first rotational axis of the roll-off element.

8. The rotary position transducer assembly according to claim 7, wherein the receptacle is a through-bore in the second rotary element.

9. The rotary position transducer assembly according to claim 7, wherein the cam supports the roll-off element by means of the rotary position transducer.

10. The rotary position transducer assembly according to claim 9, wherein the cam circumferentially encompasses the rotary position transducer.

11. The rotary position transducer assembly according to claim 9, wherein the bearing has a fixing means for locking the translational adjustment of the roll-off element.

12. The rotary position transducer assembly according to claim 11, further comprising a clamping ring and a base secured to the second rotary element and disposed between clamping ring and cam, wherein the fixing means includes the clamping ring securing the cam to the base.

13. A rotary position transducer assembly for measuring the rotation between a first rotary element and a second rotary element, the rotary position transducer assembly comprising:

a base having an opening and a means for securing the base to the second rotary element;

a cam disposed proximate the opening, the cam having a first axis of rotation;

a clamping means for fixing a rotation of the cam relative to the cam base;

a rotary position transducer coupled to the cam, the rotary position transducer having a second axis of rotation offset from the first axis of rotation; and a roll-off element rotationally coupled to the rotary position transducer.

14. The rotary position transducer assembly of claim 13, wherein the elastic roll-off element is a pinion sized and shaped to engage with a circumferential toothing of the first rotary element.

15. The rotary position transducer assembly according to claim 13, wherein the means for securing the base to the second rotary element comprises a fastener selected from the group consisting of adhesives, screws, bolts, and pins.

16. The rotary position transducer assembly according to claim 13, wherein the cam has a flange having an outer diameter greater than an inner diameter of the opening, and wherein the means for fixing a rotation of the cam relative to the base comprises a threaded fastener coupling the flange and the cam base.

17. The rotary position transducer assembly according to claim 13, wherein the roll-off element includes an elastic material.

18. The rotary position transducer assembly according to claim 17, wherein the elastic material is selected from the group consisting of plastic and rubber.

19. The rotary position transducer assembly according to claim 17 wherein the roll-off element is comprised of an annular ring of rigid material and the elastic material is contained within the annular ring of rigid material.

20. The rotary position transducer assembly according to claim 17, wherein the cam circumferentially encompasses the rotary position transducer.

* * * * *